US009014676B2

(12) United States Patent
Jager et al.

(10) Patent No.: US 9,014,676 B2
(45) Date of Patent: Apr. 21, 2015

(54) APPARATUS AND METHOD FOR CLIPSHAKER TELECOMMUNICATION SERVICE

(75) Inventors: Matthias Jager, München (DE); Karl-Heinz Häuslein, Vaterstetten (DE); Ralph Multhammer, Hohenbrunn (DE); Christoph Ferner, München (DE)

(73) Assignee: Hiprocall AG, Unterfohring (DE)

( * ) Notice: Subject to any disclaimer, the term of this patent is extended or adjusted under 35 U.S.C. 154(b) by 760 days.

(21) Appl. No.: 12/995,151

(22) PCT Filed: Jun. 2, 2008

(86) PCT No.: PCT/EP2008/056777
§ 371 (c)(1),
(2), (4) Date: Feb. 7, 2011

(87) PCT Pub. No.: WO2009/146733
PCT Pub. Date: Dec. 10, 2009

(65) Prior Publication Data
US 2011/0124322 A1  May 26, 2011

(51) Int. Cl.
*H04M 3/42* (2006.01)
*H04M 3/02* (2006.01)
(Continued)

(52) U.S. Cl.
CPC .......... *H04M 3/42153* (2013.01); *H04M 3/02* (2013.01); *H04M 3/42017* (2013.01); *H04M 3/4872* (2013.01); *H04M 3/53383* (2013.01); *H04M 2201/60* (2013.01); *H04M 2203/2016* (2013.01); *H04M 2203/4536* (2013.01)

(58) Field of Classification Search
CPC ...... H04L 12/5895; H04L 51/38; H04W 4/14

USPC .............. 455/414.1, 418, 412.1, 415, 567; 345/473; 715/719, 730, 723
See application file for complete search history.

(56) References Cited

U.S. PATENT DOCUMENTS

2003/0215214 A1* 11/2003 Ma .................................. 386/52
2004/0114732 A1    6/2004 Choe et al.
(Continued)

FOREIGN PATENT DOCUMENTS

WO    WO 02/054743 A2    7/2002
WO    WO 2005/006721 A1   6/2005
(Continued)

*Primary Examiner* — Fred Casca
(74) *Attorney, Agent, or Firm* — Miles & Stockbridge PC

(57) ABSTRACT

A system and a method provide individualized clip telecommunication services to a user of a telecommunication network. A clip is defined by comprising at least video data. The system comprises a clip configuration subsystem configured to arrange a personalized clip based on pre-configured clip building blocks. Further, the system comprises a service provision subsystem configured to provide a personalized clip telecommunication service by subjecting a respective personalized clip to at least one basic clip utilization service. The basic clip utilization service may be selected from a group comprising a mailbox greeting service for video-enabled terminals, a ring tone service for video-enabled terminals, a ring back tone service for video-enabled terminals, an outbound greeting service for video-enabled terminals, an email service, a download service, a video format conversion service, a common access service, as well as a timer delivery service.

8 Claims, 7 Drawing Sheets

(51) Int. Cl.
*H04M 3/487* (2006.01)
*H04M 3/533* (2006.01)

(56) References Cited

U.S. PATENT DOCUMENTS

| 2006/0135127 | A1* | 6/2006 | Aarnio et al. | 455/412.1 |
| 2007/0099604 | A1 | 5/2007 | Shanahan | |
| 2007/0127686 | A1 | 6/2007 | Song et al. | |
| 2007/0234214 | A1* | 10/2007 | Lovejoy et al. | 715/719 |
| 2008/0189659 | A1* | 8/2008 | Krutzler | 715/838 |
| 2009/0205018 | A1* | 8/2009 | Ferraiolo et al. | 726/1 |
| 2010/0169935 | A1* | 7/2010 | Abbruzzese | 725/62 |

FOREIGN PATENT DOCUMENTS

| WO | WO 2006/042042 A1 | 4/2006 |
| WO | WO 2007/058522 A1 | 5/2007 |

* cited by examiner

APPARATUS AND METHOD FOR CLIPSHAKER TELECOMMUNICATION SERVICE

FIELD OF THE INVENTION

The present invention relates to the provision of video clip-based telecommunication services. In particular, the present invention relates to an apparatus and a method for providing personalized video clip-based telecommunication services.

PRIOR ART

In mobile as well as landline telecommunication networks, there is a trend of increasingly emerging value-added services besides the conventional communication services. Such value-added or add-on services may be divided into data and voice services.

Value-added voice services are a commonly used feature in today's telecommunication networks, thus representing an important profit factor for carriers, i.e. network operators. Examples for sound-based telecommunication services comprise, among others, call answering services (i.e. mailbox services), ring tone services, and (color) ring back tone services (CRBT).

For example, document US 2004/0114732 A1 discloses an apparatus and method for an editable personalized ring back tone service. Specifically, the apparatus may include a master content provider server storing at least one personalized ring back message, an internet data center connected to the master content provider server and a participating telephone service provider for retrieving the personalized ring back message when a called party is the subscriber and delivering the personalized ring back message to be heard by a calling party while connecting to the called party, and an authoring tool for generating and editing the personalized ring back message to be uploaded to the master content provider through a public website.

In addition, document WP 02/054743 A2 discloses a web based messaging system with personalized caller specific messages. The messaging system allows a user to provide caller specific personalized messages, for example voice greetings, to incoming callers. The messaging system may be configured remotely, for example via the internet/world wide web. The messaging system comprises a message and a processing system. The processing system comprises a caller identification system and a database of specific messages linked to specific caller identification data. The processing system maintains an individual customer profile for the user that the user can configure with specific messages, e.g. voice mail greetings, and to control and specify which message is provided to a particular caller.

Furthermore, document WO 2005/006721 A1 discloses a method and apparatus for changing and pushing a sound source of a supplementary service using a ring back tone on calling.

In the prior art, there are known platforms which allow users to download a number of different ring tones, to download a number of different active ring back tones, to upload mailbox greetings and to send sound greetings e.g. to friends.

However, only a certain number of given sound samples are available. In case of ring tones this leads, for example, to the problem that the user can not necessarily distinguish between his/her own terminal ringing or that of another user in the vicinity. In case of ring back tones, i.e. those audio sounds heard by a caller while waiting for a connection to a called party to be completed, especially for business users, in view of professional appearance and corporate identity it is not desired to have a standard ring back tone played to a caller.

Especially with many users in a telecommunication network, the distinction between the users' personal sound settings and services becomes increasingly less. However, not only younger users want to separate from others and express their individuality. A standard ring tone, ring back tone or greeting is thus not desired anymore.

In known systems for personalization, there is usually only provided for a selection of a fixed number of unalterable options, thus not representing an actual personalization in the real meaning of the term.

SUMMARY OF THE INVENTION

Hence, there resides a problem in that no solutions are presently available for personalization/individualization of telecommunication features to an extent acceptable for private and business users.

In consideration of this fact, according to the present invention it has been recognized that for the personalization/individualization of telecommunication features, video-based services are not yet considered to a sufficient extent. Since particularly within mobile telecommunication, but not limited thereto, the availability of video-enabled terminals (multimedia terminals) is widespread, in addition to providing a personalization/individualization of telecommunication services based on distinguishing sounds, video clips can be taken into consideration.

On the other hand, due to the increased complexity of video data compared to audio data, and due to the increased complexity in underlying themes, user may want to rely on pre-configured building blocks for a video clip to be utilized in personalization/individualization.

This holds true even more if it is thought about business users, e.g. firms, which may want to have a telecommunication service appearance in line with (or creating) their corporate identity involving video services in order to emphasize modern thinking.

Accordingly, enabling the provision of personalized video clips based on pre-configured clip building blocks provides a comparatively easy and fast way to have a common video-based appearance with all sorts of telecommunication services such as a mailbox greeting service for video-enabled terminals, a ring tone service for video-enabled terminals, a ring back tone service for video-enabled terminals, an outbound greeting service for video-enabled terminals, an email service, a download service, a video format conversion service, a common access service, as well as a timer delivery service.

Regarding the pre-configured building blocks, it is thus still possible to exclusively produce a limited number of pre-configured clip building blocks for a certain (business) user which may be used in different combinations with e.g. added music/audio in dependency from the actual service and/or the technical, business, hierarchical etc. environment.

According to a first aspect of the present invention, the above is accomplished by a system comprising a clip configuration subsystem configured to arrange a personalized clip based on pre-configured clip building blocks, wherein a clip is defined by comprising at least video data; and a service provision subsystem configured to provide a personalized clip telecommunication service by subjecting a respective personalized clip to at least one basic clip utilization service selected from a group comprising a mailbox greeting service for video-enabled terminals, a ring tone service for video-enabled terminals, a ring back tone service for video-enabled terminals, an outbound greeting service for video-enabled terminals, an email service, a download service, a video format conversion service, a common access service, as well as a timer delivery service.

The system according to the first aspect may be considered to from a system for providing individualized clip telecommunication services.

The first aspect may be modified as follows.

The service provision subsystem can be further configured to provide the personalized clip telecommunication service by subjecting respective personalized clips to two or more basic clip utilization services selected from said basic clip utilization service group, wherein the pre-configured clip building blocks are re-used for each basic clip utilization service.

The clip configuration subsystem can be further configured to arrange a personalized clip based on pre-configured clip building blocks by way of user operation including one or more selected from a group comprising adding two or more pre-configured clip building blocks, amending a pre-configured clip building block, adding individual music to a pre-configured clip building block, adding one or more pre-configured audio files to a pre-configured clip building block, adding placeholder building blocks, replacing placeholder building blocks, and uploading user-edited clips and/or audio files for adding the same with a pre-configured clip building block.

The clip configuration subsystem can be further configured to store a personalized clip configured by way of user operation so that this personalized clip can be subjected by the service provision subsystem to one or more basic clip utilization services by using and/or re-using this personalized clip.

The download service can be configured to use the push short message service according to the wireless application protocol for initiating a download to a mobile terminal.

The video format conversion service can be configured to convert into the 3GP multimedia container format, the flash video format, any of the moving picture experts group data formats, the audio video interleave video format and the like.

Although phrased above as a "system", the first aspect of the present invention can, according to certain embodiments thereof, be implemented in a single apparatus or a plurality thereof, including a chipset or a single chip.

According to a second aspect of the present invention, the above is accomplished by a method comprising configuring a personalized clip based on pre-configured clip building blocks, wherein a clip is defined by comprising at least video data; and providing a personalized clip telecommunication service by subjecting a respective personalized clip to at least one basic clip utilization service selected from a group comprising a mailbox greeting service for video-enabled terminals, a ring tone service for video-enabled terminals, a ring back tone service for video-enabled terminals, an outbound greeting service for video-enabled terminals, an email service, a download service, a video format conversion service, a common access service, as well as a timer delivery service.

The method according to the second aspect may be considered to form a method of providing individualized clip telecommunication services.

The method according to the second aspect may be embodied as an information providing method.

Furthermore, the second aspect may be embodied as an information providing apparatus comprising respective means configured to perform the above described actions.

The second aspect may be further modified as follows.

Providing a personalized clip telecommunication service can comprise subjecting respective personalized clips to two or more basic clip utilization services selected from said basic clip utilization service group, wherein the pre-configured clip building blocks are re-used for each basic clip utilization service.

Configuring a personalized clip based on pre-configured clip building blocks can comprise user operation including one or more selected from a group comprising adding two or more pre-configured clip building blocks, amending a pre-configured clip building block, adding individual music to a pre-configured clip building block, adding one or more pre-configured audio files to a pre-configured clip building block, adding placeholder building blocks, replacing placeholder building blocks, and uploading user-edited clips and/or audio files for adding the same with a pre-configured clip building block.

The method can further comprise storing a personalized clip arranged by way of user operation so that this personalized clip can be subjected to one or more basic clip utilization services by using and/or re-using this personalized clip.

The method can further comprise using the push short message service according to the wireless application protocol by the download service for initiating a download to a mobile terminal.

The method can further comprise converting into the 3GP multimedia container format, the flash video format, any of the moving picture experts group data formats, the audio video interleave video format and the like, by the video format conversion service.

According to a third aspect of the present invention, the above is accomplished by a computer program product comprising program code means configured to perform any of the steps of the method according to the second aspect of the present invention or any of its modifications when the program is run on a computer.

According to a fourth aspect of the present invention, the above is accomplished by a computer-readable storage medium encoded with instructions that, when executed by a computer, perform: configuring a personalized clip based on pre-configured clip building blocks, wherein a clip is defined by comprising at least video data; and providing a personalized clip telecommunication service by subjecting a respective personalized clip to at least one basic clip utilization service selected from a group comprising a mailbox greeting service for video-enabled terminals, a ring tone service for video-enabled terminals, a ring back tone service for video-enabled terminals, an outbound greeting service for video-enabled terminals, an email service, a download service, a video format conversion service, a common access service, as well as a timer delivery service.

The computer-readable storage medium according to the fourth aspect may be considered to provide individualized clip telecommunication services.

The fourth aspect may be modified as follows.

Providing a personalized clip telecommunication service can comprise subjecting respective personalized clips to two or more basic clip utilization services selected from said basic clip utilization service group, wherein the pre-configured clip building blocks are re-used for each basic clip utilization service.

Configuring a personalized clip based on pre-configured clip building blocks can comprise user operation including one or more selected from a group comprising adding two or more pre-configured clip building blocks, amending a pre-configured clip building block, adding individual music to a pre-configured clip building block, adding one or more pre-configured audio files to a pre-configured clip building block, adding placeholder building blocks, replacing placeholder building blocks, and uploading user-edited clips and/or audio files for adding the same with a pre-configured clip building block.

The instructions can further comprise storing a personalized clip arranged by way of user operation so that this personalized clip can be subjected to one or more basic clip utilization services by using and/or re-using this personalized clip.

The instructions can further comprise using the push short message service according to the wireless application protocol by the download service for initiating a download to a mobile terminal.

The instructions can further comprise converting into the 3GP multimedia container format, the flash video format, any of the moving picture experts group data formats, the audio video interleave video format and the like, by the video format conversion service.

BRIEF DESCRIPTION OF THE DRAWINGS

In the following, the present invention will be described in greater detail by means of embodiments with reference to the accompanying drawings, in which.

DETAILED DESCRIPTION OF EMBODIMENTS

Figure 1:
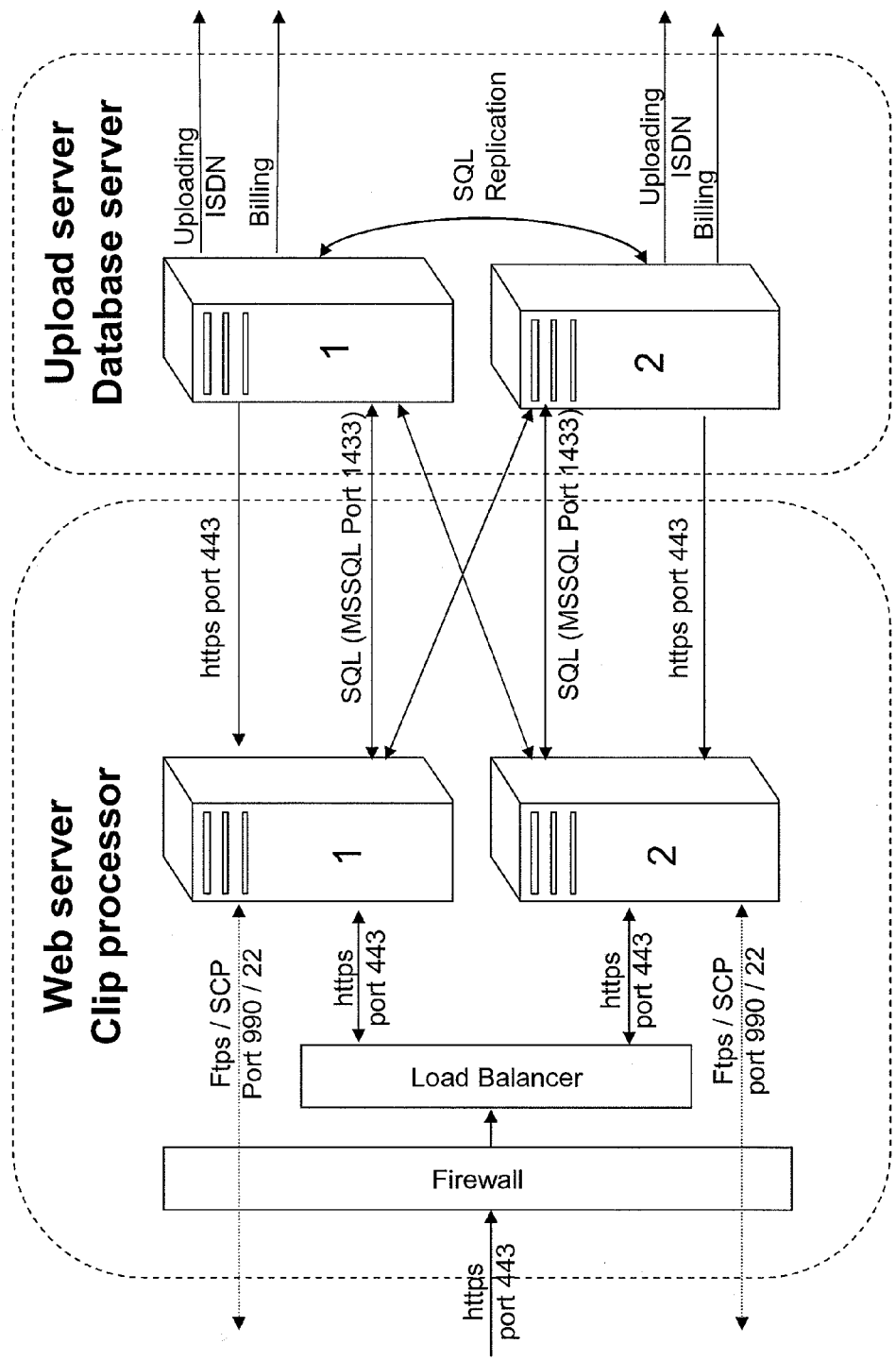
FIG. 1 shows a block diagram of system architecture according to an embodiment of the present invention.

Embodiments of the present invention are described below with reference to particular non-limiting examples. However, it is to be understood that the present invention is not to be construed as being limited to these examples.

In particular, embodiments of the present invention are described in relation to certain services of a telecommunication network with reference to example implementations. As such, the description of the embodiments given herein specifically refers to terminology which is directly related to these non-limiting examples.

However, the term "clip" is used in the following in any case to comprise at least video data.

It is furthermore to be noted that the features described herein below pertaining to particular embodiments may be used with any other embodiment as well thus forming new embodiments unless described to the contrary.

Stated in general terms, the embodiments of the present invention relate to a system and a method for providing personalized clip telecommunication services.

Such a system basically comprises a clip configuration subsystem configured to provide a personalized clip based on pre-configured clip building blocks and a service provision subsystem configured to provide a personalized telecommunication service by subjecting a respective personalized clip to at least one basic clip utilization service. Such a method basically comprises arranging of a personalized clip based on pre-configured clip building blocks and a provision of a personalized telecommunication service by subjecting a respective personalized clip to at least one basic clip utilization service.

A particular further effect may be achieved if it is taken full advantage of the provision of pre-configured clip building blocks in that two or more basic clip utilization services (to be described in the following) re-use the pre-configured clip building blocks according to the clip configuration subsystem to form a clip telecommunication service.

The term "personalized" is used here for describing the user-selective and thus individual nature of the clip-building. However, a "personalized" clip shall still also encompass clips which are intended for use by a plurality of users. For example, this may include the use of one or more placeholder building blocks intended for later replacement by distinguishing individual building blocks respectively pointing at a single user.

For simplicity, in the following embodiments of the present invention are substantially described in terms of system aspects. It should however be understood that such description relates to respective method aspects as well.

By the same token, it is to be noted that embodiments of the present invention may be implemented within a single apparatus (physically or logically) or with a distributed functionality. For example, but not exclusively, embodiments of the present invention may be implemented within a chipset or a single chip. Moreover, embodiments of the present invention may be implemented as a computer program product comprising program code means configured to perform any of the steps of the method according to certain embodiments of the present invention when the program is run on a computer such as a server or a plurality of server. According to certain embodiments of the present invention, the computer program product can be a computer-readable storage medium encoded with respective instructions.

FIG. 1 shows a block diagram of system architecture according to an embodiment of the present invention. The interfaces between the individual blocks shown in FIG. 1 are denoted by an abbreviation of a protocol and a port number, via which the processing between those blocks is conducted. As these protocols and ports are merely implementation examples and thus provided for illustrative purposes, only, and as such are well-known to a skilled person, no detailed description thereof will be given hereinafter.

The left-hand part denoted by web server or clip processor represents a clip configuration subsystem. The clip configuration subsystem is configured to provide a user with the ability to arrange a personalized clip based on pre-configured clip building blocks by way of user operation. According to the system of the present embodiment, this subsystem is implemented as a web-based tool having a web-based user interface to be operated by a user by means of a hypertext transport protocol, e.g. HTTP or HTTPS, and specific ports. In FIG. 1, this is exemplarily depicted by the incoming arrow from the left side, which is denoted by "https port 443".

The clip configuration subsystem is exemplarily depicted to comprise two parallel servers, which process traffic from a user (incoming via a firewall) according to a distribution by a load balancer.

The right-hand part denoted by upload server or database server represents (at least a part of) a service provision subsystem. The service provision subsystem is configured to provide to a user a personalized clip telecommunication service based on basic clip utilization services of a telecommunication network and the personalized clip configured at the clip configuration subsystem. The two servers, which are exemplarily depicted to work in parallel, are both configured to perform uploading and billing functionality. Details thereof will be referred to below.

By way of user operation, e.g. via the Internet, a user can choose between different clip creation actions by first selecting a pre-configured clip building block and then selecting among a creation action such as adding two or more pre-configured clip building blocks, amending a pre-configured clip building block, adding individual music to a pre-configured clip building block, adding one or more pre-configured audio files to a pre-configured clip building block, adding placeholder building blocks, replacing placeholder building blocks, and uploading user-edited clips and/or audio files for adding the same with a pre-configured clip building block. The replacement of a placeholder building block may be made by any of the mentioned creation actions. That is, in accordance with the latter example, embodiments of the present invention advantageously allow a user to produce self created content by uploading their own videos and/or clips.

For implementing these features, the system (i.e. the servers of the clip configuration subsystem) can comprise storage means storing pre-configured clip building blocks, selection means for selecting at least one of the above described creation actions, and processing means for creating a personalized clip based on the performed creation actions.

As an example, the user may in a first step choose a first pre-configured clip building block. Then, as a second step, the user may select a pre-configured audio file also provided at the clip configuration subsystem for forming background sound to the clip. Alternatively, the pre-configured clip building block selected first may already have included a "sound track", i.e. either e.g. background music or spoken words or both. Together, video and audio thus combined may represent a theme which is commonly known such as an excerpt from a movie or a sports sequence. Thereafter, a user-edited clip with a respective audio file may be uploaded and added which represents a theme which the user, business or private, deems to represent her/his identity, at least in combination with the probably more commonly known "first" part. Furthermore, it is possible to include a placeholder building block among the others. In this manner, it is e.g. possible to produce a clip which is intended for being commonly used by a number of users such as employees of a company, wherein one or more placeholder building blocks are present in the clip at places where a personal individualization is to be effected later by replacing the placeholder building block by building blocks pointing at a single user such as the spoken name of the single user or the like.

It is apparent that many other possibilities arise from the above described creation actions which may be performed in any reasonable order so as to lead to a personalized/individualized clip based on pre-configured clip building blocks.

By means of preparation means (not shown) in the clip configuration subsystem, according to one embodiment, the selected pre-configured clip building blocks or uploaded user-edited clips and the like can be further edited for individualization. Such preparation means can e.g. be operable for mixing the elements for constituting the final clip in any feasible way, adjusting volumes of certain clip sequences, adapting intro and/or outro lengths of clip sequences, and/or pre-playing the finished clip to the user in realtime.

For example, the volume of the music may be decreased, whereas the volume of the voice may be increased.

According to a further embodiment, the system is connectable to external platforms providing sounds, e.g. music. This option further contributes to the availability of the most up-to-date music, which users like to use best.

The clip configuration subsystem of one embodiment further comprises an activation means in order to enable the user to order the personalized clip, and/or to send it as a ring tone (e.g. in a short message service), a ring back tone or an outbound clip greeting to an appropriate video-enabled entity in the system or in the network. It is to be noted that the term "tone" is used here for easy reference to known services, whereas the service considered here is of course related to video and not only to audio.

Especially for business users, it may be desirable that, on the one hand, every employee is enabled to configure his/her basic clip utilization service (such as mailbox greetings) and that, on the other hand, the corporate identity or professional appearance to the outside is preserved (video business card). Such corporate identity can e.g. be achieved by the above described use of common clips having placeholders, wherein the placeholders are later replaced by building blocks pointing at the individual user.

According to one embodiment, the system enables such a feature in that the clip configuration subsystem further comprises authorization means for managing and controlling an authorization of a user and admission means for admitting a user to utilize those of the pre-configured clip building blocks for configuring a personalized clip, for which his/her authorization is approved. This may e.g. include the authorization to only exchange any present placeholder building block by selected ones of other building blocks such as a self created building block comprising the spoken name of the user.

In another embodiment, a manager may for example be authorized to freely select any available clip building block including music and voice. Thus, the manager may configure a clip without any limitations either for his/her personal purposes and/or those of his/her department, for example. In this case, the employees of this department may for example be authorized to select music additions only, but not music and voice, for the clip to be created. Hence, all employees of this department will have e.g. mailbox greetings with the same (opening) video, but with different audio, thus being personalized according to the respective names of the employees.

Accordingly, the personalization of the clip may be further simplified for low priority users, but still with a common recognizable part. For example, only the name and direct dial number of the employee may be selected by him/her.

In the following, there will be described detailed embodiments pertaining to different basic clip utilization services.

Basically, the clip configuration parts (i.e. subsystem) of these embodiments are rather equivalent to each other, unless otherwise specified, whereas the service provision parts (i.e. subsystem) differ, i.e. the techniques to provide a personalized telecommunication service.

Figure 2:
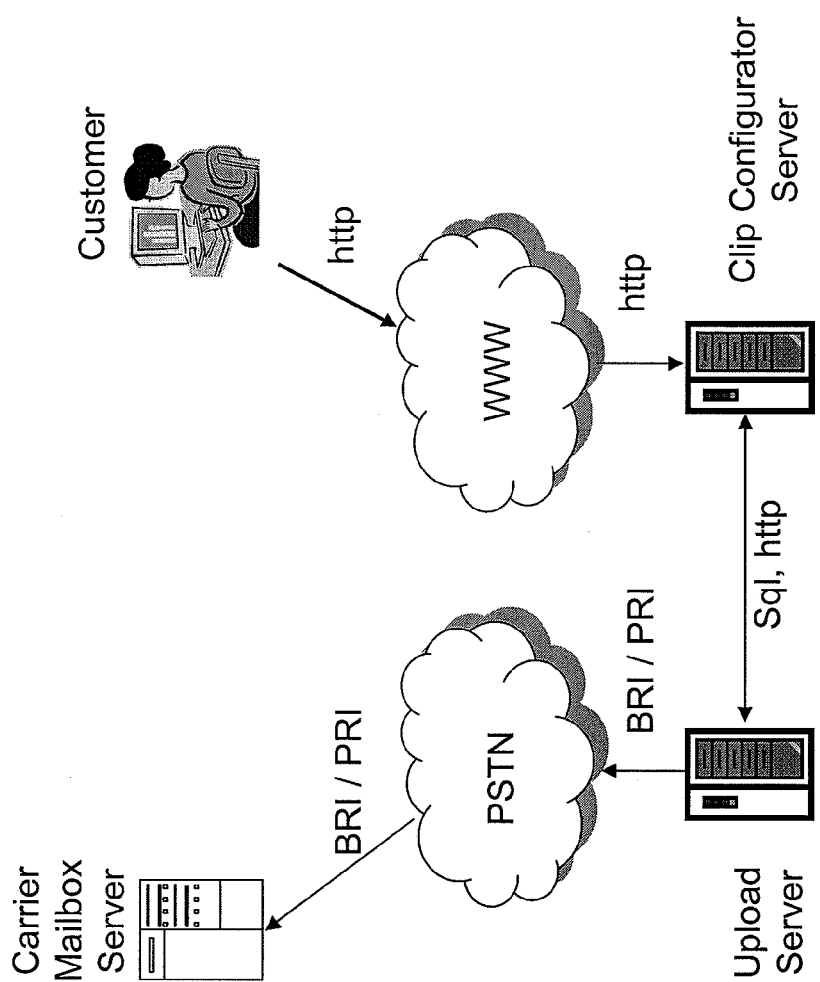
FIG. 2 shows a schematic block diagram of a mailbox greeting system according to an embodiment of the present invention.

FIG. 2 shows a schematic block diagram of a mailbox greeting system according to an embodiment of the present invention. That is, the thus depicted system is configured to process a mailbox greeting service as a basic clip utilization service to which a personalized clip created according to the clip configuration subsystem is subjected.

As illustrated in the example of FIG. 2, after log on and/or registration, a user (customer) connects to a system according to the present embodiment via the Internet (www: world wide web), i.e. using a hypertext transport protocol like HTPP or HTTPS. By way of user operation, a personalized clip is configured at the clip configurator server, as described above.

In general, embodiments of the present invention encompass a number of different possibilities for a user to access to the system and method according to the present invention. Access possibilities include inter alia, but not exclusively, a personal computer, a mobile phone browser as well as other types of user-related communication terminals.

According to the present embodiment, the service provision subsystem comprises an upload server for receiving a personalized clip from the clip configuration subsystem and for uploading the received clip to a mailbox server of the telecommunication network via a telecommunication interface.

In detail, a finished clip from the clip configurator server is transferred to a separate upload server which is exemplarily implemented as an IVR (interactive voice response) server. To this end, HTTP and/or SQL (structured query language) may be used on the interface between these two servers. The upload server then connects to a mailbox server of the network, i.e. of the carrier, and uploads the transferred clip as a welcome greeting to the user's mailbox on the carrier's video-enabled mailbox system. Accordingly, callers which are redirected to the user's mailbox will see this individual message.

For uploading the clip to the mailbox server, the upload server is configured to use a telecommunication interface of the network. In FIG. 2, this interface is illustrated as an ISDN (Integrated Services Digital Network) service via a public switched telephone network (PSTN). In ISDN, either a basic rate interface (BRI) according to ITU.T I.430 or a primary rate interface (PRI) according to ITU.T I.431 may be used. Via such a telecommunication interface, the upload server dials the mailbox server's direct access number (where customers can look at and adapt their messages manually from any video-enabled terminal) and uploads the new greeting automatically using a dual tone multi frequency (DTMF) tone navigation according to ITU.T Q.23.

In order to be able to interact with a carrier's mailbox system, the upload server is to be configured to the carrier-dependent navigation tree of the mailbox system.

Figure 3:
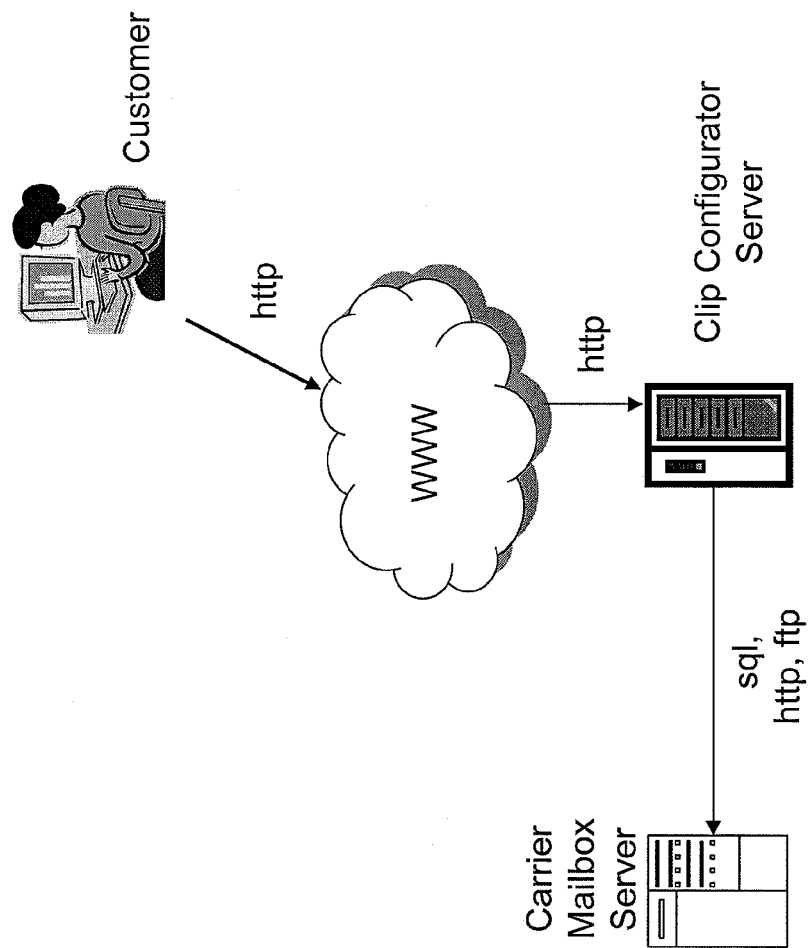
FIG. 3 shows a schematic block diagram of a mailbox greeting system according to another embodiment of the present invention.

FIG. 3 shows a schematic block diagram of a mailbox greeting system according to another embodiment of the present invention. That is, the thus depicted system is again configured to process a mailbox greeting service as a basic clip utilization service.

As illustrated in the example of FIG. 3, a user connection to a system according to the present embodiment and the clip configuration is effected similarly as described above.

According to the present embodiment, the service provision subsystem comprises digitization means (not shown) for digitizing a personalized clip from the clip configuration subsystem and transfer means for transferring the digitized clip to a mailbox server of the telecommunication network in a predetermined digital format.

In detail, a finished clip from the clip configurator server is converted into a digital format. Then, this digitized clip is transferred in digital form to a mailbox system of a carrier, which is connected to the clip configurator server via HTTP and/or SQL. The digital transfer is for example executed by means of FTP (file transfer protocol), SCP (secure copy program) or VPN (virtual private network). The new greeting is being registered in the user database of the mailbox system.

No pre-configuration e.g. to the tone navigation of a carrier's mailbox system as according to the above embodiment is needed here.

Figure 4:
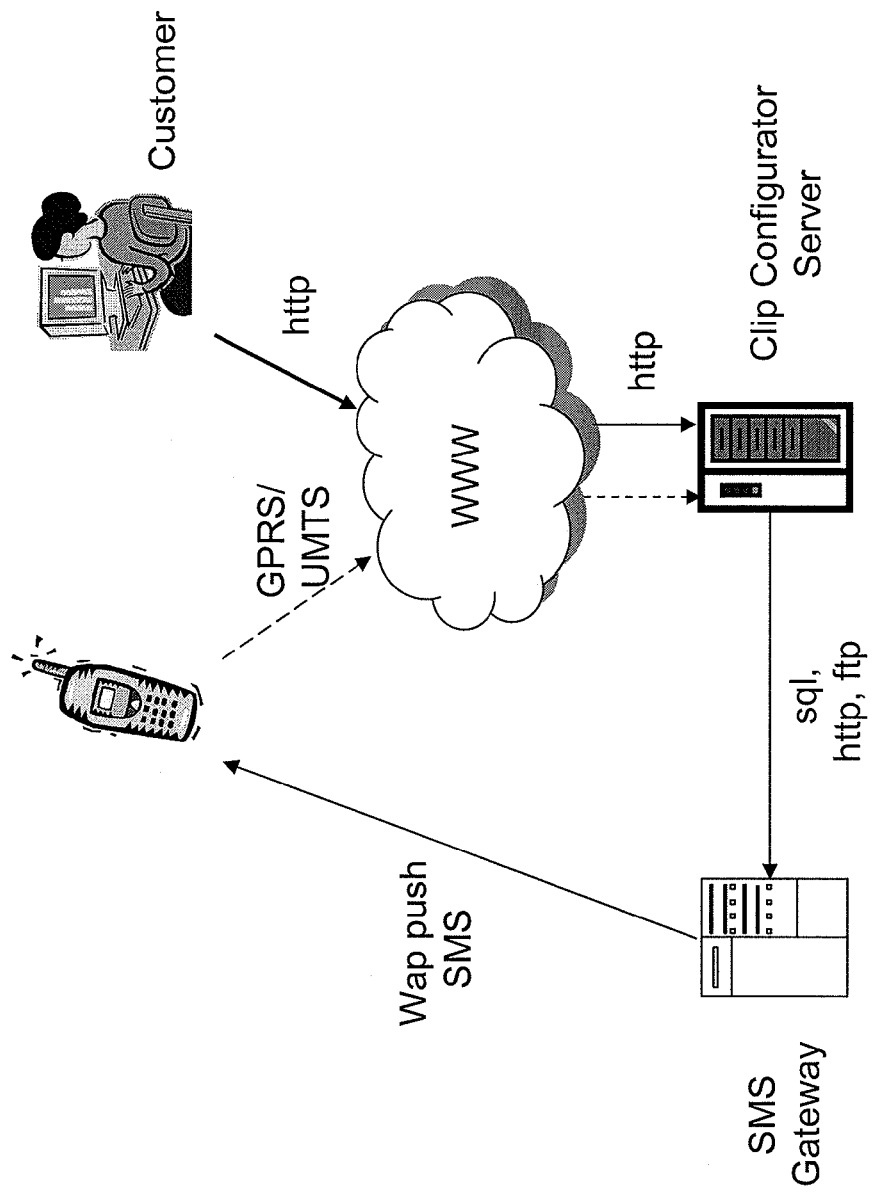
FIG. 4 shows a schematic block diagram of a ring tone system according to an embodiment of the present invention.

FIG. 4 shows a schematic block diagram of a ring tone system according to an embodiment of the present invention. That is, the thus depicted system is configured to process a clip within a ring tone service as a basic clip utilization service.

As illustrated in the example of FIG. 4, a user connection to a system according to the present embodiment and the clip configuration is effected similarly as described above.

According to the present embodiment, the service provision subsystem comprises a storage server (not shown) for storing a personalized clip from the clip configuration subsystem with a unique address and a gateway server for receiving the address of the stored clip and for sending a push message according to a wireless application protocol (WAP) to a terminal of the user. The push message comprises said address or a link thereto, and the storage server is configured to upload said personalized clip to the user's (video-enabled) terminal upon request using a packet data connection.

In detail, a finished clip, i.e. a realtime ring tone (video), from the clip configurator server is stored on a (web) server with a unique file name, i.e. address. The file format may depend on the user's type of terminal. The storage (web) server is not explicitly shown in FIG. 4, and may for example be arranged at the clip configurator server or at the SMS gateway depicted in FIG. 4.

The file name, i.e. address, of the stored clip is transferred to a gateway server of the telecommunication network, e.g. via HTTP, SQL, and/or FTP. Then, the gateway server, for example an SMS (short message service) gateway server, sends a WAP push message, for example a WAP push SMS, to the user's video-enabled terminal. The WAP push message e.g. includes a link to the personalized (video) ring tone (i.e. clip) stored at the above-mentioned storage server.

Then, upon request from the user's terminal, the stored ring tone is downloaded from the storage server to the user's terminal using a packet data connection such as for example a GPRS (general packet radio service) or a UMTS (universal mobile telecommunication system) connection. According to FIG. 4, the download is depicted by dashed arrows to/from the www "cloud", indicating that the storage server is assumed to be arranged at the clip configurator server. Such a download, which from point of view of the storage server represents an upload, may be limited to a maximum number, which is implemented by a kind of network-based or terminal-based counter.

The carrier system does not have to be changed in structure for implementation of this embodiment.

Figure 5:
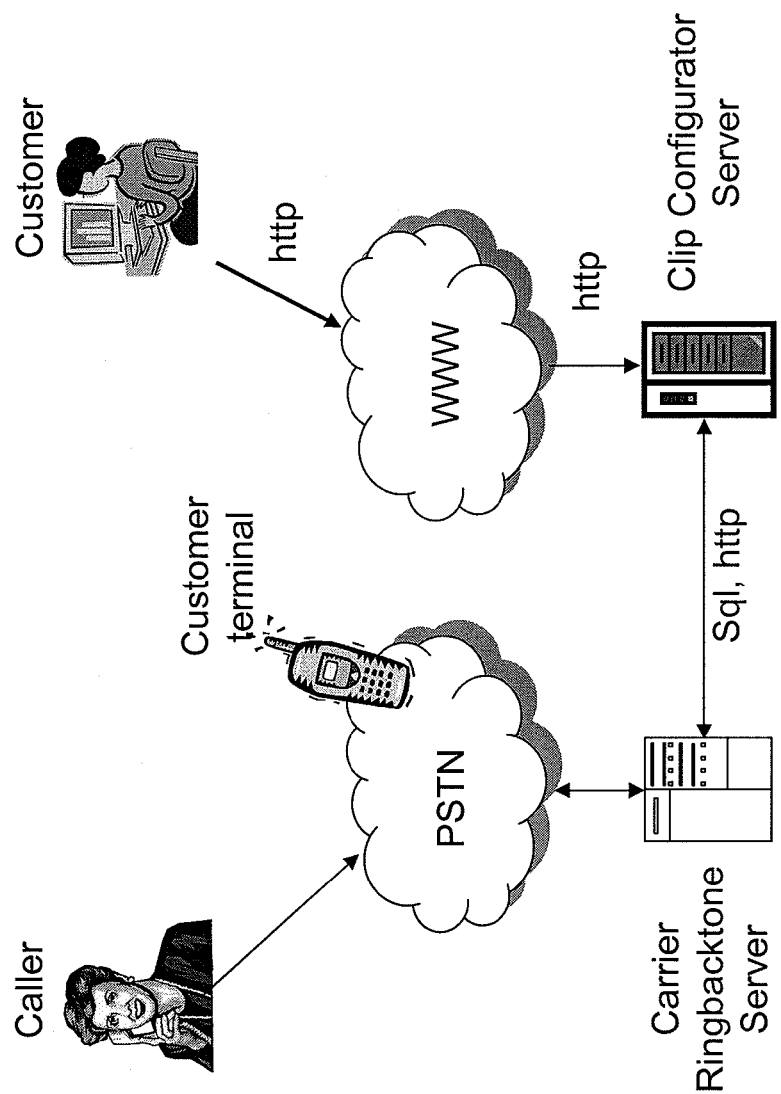
FIG. 5 shows a schematic block diagram of a ring back tone system according to an embodiment of the present invention.

FIG. 5 shows a schematic block diagram of a ring back tone system according to an embodiment of the present invention. That is, the thus depicted system is configured to process a (clip) ring back tone service as a basic clip utilization service.

As illustrated in the example of FIG. 5, a user connection to a system according to the present embodiment and the clip configuration is effected similarly as described above.

According to the present embodiment, the service provision subsystem comprises uploading means for receiving a personalized clip from the clip configuration subsystem and for uploading said clip to a ring back tone server of the telecommunication network.

In detail, the personalized ring back tone clip is uploaded from the clip configurator server to a ring back tone server of the carrier network, for example by means of HTTP and/or SQL. No further action or processing is needed for providing and activating this service. Only a dedicated gateway for automatically uploading ring back tones to the carrier's network needs to be provided by the system of the present embodiment.

Then, when a caller calls the user's terminal exemplarily being located in a public switched telephone network PSTN, the ring back tone for this user (and/or for the specific caller) is fetched from the carrier ring back tone server and played to the video-enhanced terminal of the caller instead of a standard call connected signal, for example.

Figure 6:
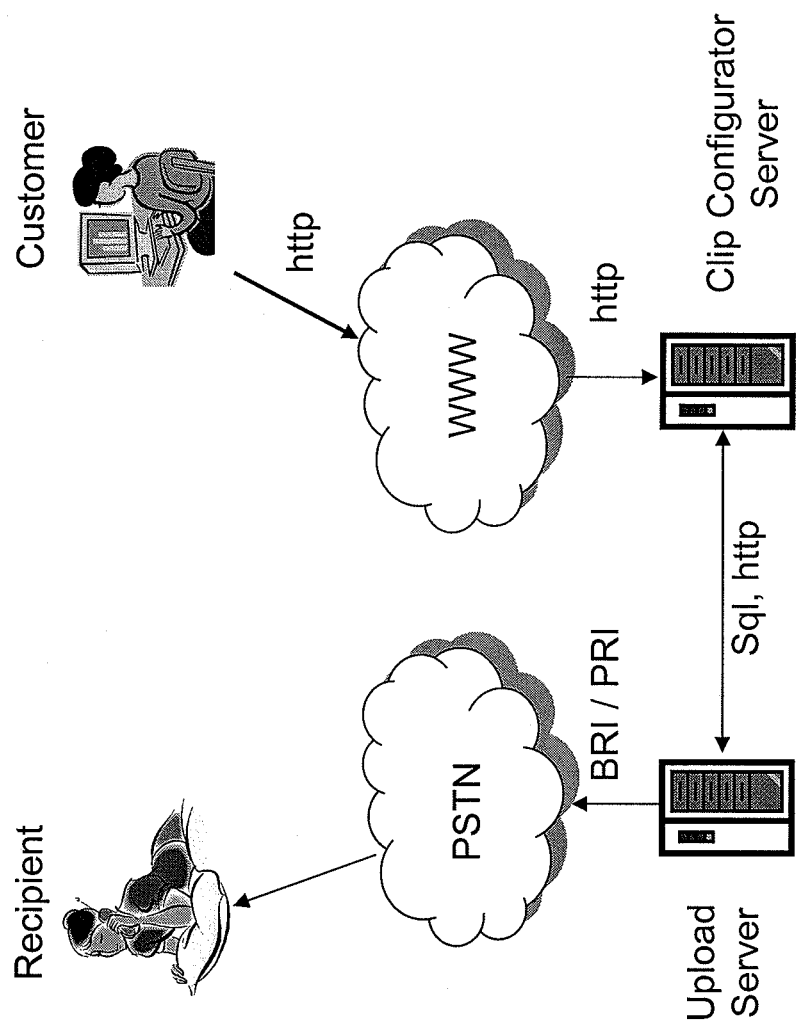
FIG. 6 shows a schematic block diagram of an outbound greeting system according to an embodiment of the present invention.

FIG. 6 shows a schematic block diagram of an outbound greeting system according to an embodiment of the present invention. That is, the thus depicted system is configured to process an outbound greeting service as a basic clip utilization service.

As illustrated in the example of FIG. 6, a user connection to a system according to the present embodiment and the clip configuration is effected similarly as described above.

According to the present embodiment, the service provision subsystem comprises an upload server for receiving a personalized clip from the clip configuration subsystem and for uploading the received clip to another user's terminal via the network.

Hence, the structure of this embodiment is similar to that of the embodiment according to FIG. 2. Yet, besides receiving a finished clip from the clip configurator server, the upload server of this embodiment (for example an IVR server) uploads the clip directly to another user's video-enabled terminal. To this end, a telecommunication interface such as ISDN (BRI/PRI) is used. That is, the upload server dials the number of a desired recipient of the outbound greeting message and plays the respectively personalized clip of the system user to the recipient user, when answering the call.

If there is an answering machine (mailbox) on the line, the greeting is played as a new message to the answering machine. To this end, the system (i.e. the upload server) is configured to identify that a (video-enabled) answering machine is on the line, and when a message may be recorded (e.g. by detecting the respective signal tone starting a message recording period).

Figure 7:
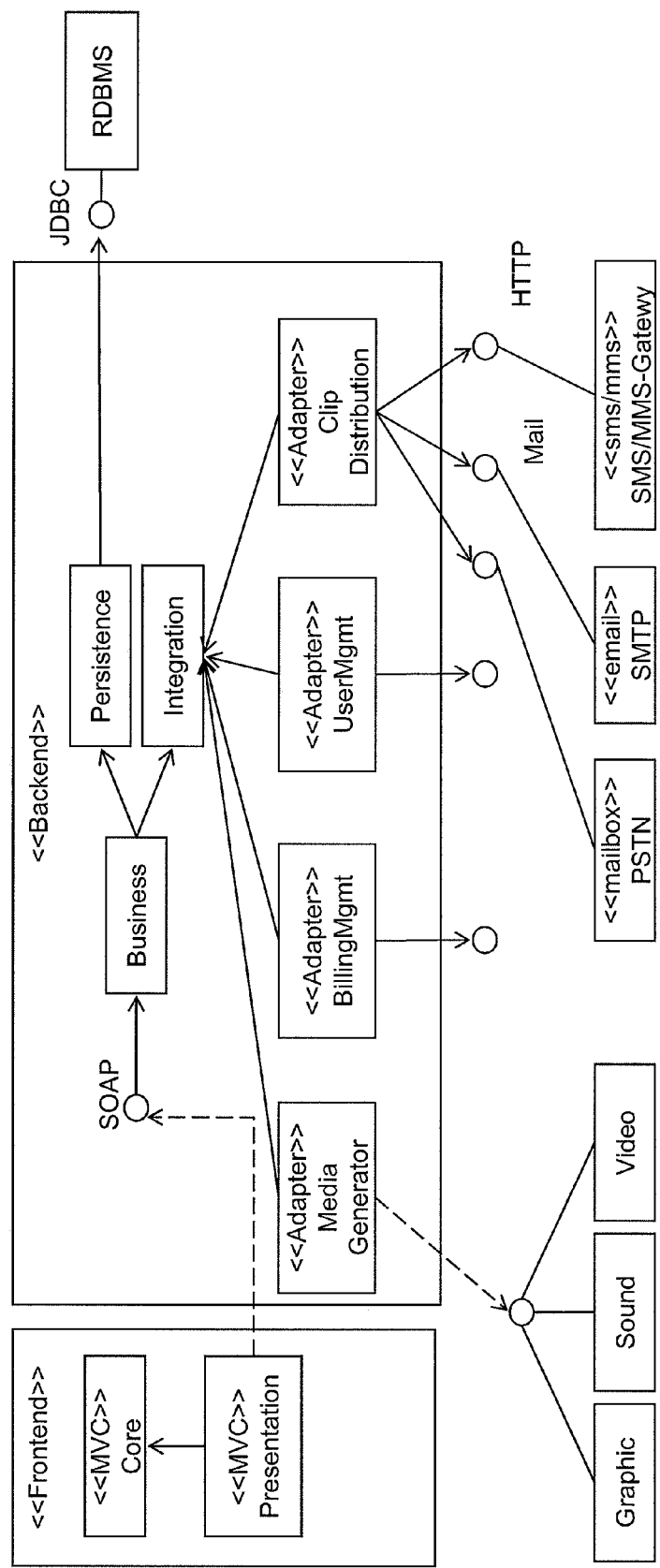
FIG. 7 shows an implementation example according to certain embodiments of the present invention.

FIG. 7 shows another implementation example according to certain embodiments of the present invention.

As illustrated, the present implementation example comprises a frontend server and a backend server. The connection between them may be effected by utilizing the simple object access protocol (SOAP).

In accordance with certain embodiments, the frontend server can be arranged according to the architectural pattern of a model view controller (MVC) to handle the data independently of the user interface. Thus, the frontend server comprises the functionalities of MVC core and MVC presentation.

Regarding the backend server, in accordance with certain embodiments of the present invention, the backend server encapsulates the complete business logic based on persistence and integration logic. They are also encapsulated as adaptable services in the backend server.

The business logic integration functionality comprises a plurality of adapter such as a media generator with which graphic sound and video can be generated, a billing management, a user management, a clip distribution processor which, according to needs, is provided with a transmitter so as to send the clips to e.g. a PSTN mailbox service, a SMTP (simple mail transfer protocol) email service, and/or a SMS/MMS-Gateway (providing short message and/or multimedia message services). The transmission may be made by using appropriate protocols such as HTTP.

The above described embodiments comprise at least one of the following advantages. There is an overall system solution for a variety of different clip telecommunication services; implementations can be made easy and carrier-independent; and the structures can be flexible to fit different carrier's networks.

According to the above, there is presented a system and a method for providing individualized clip telecommunication services to a user of a telecommunication network. A clip is defined by comprising at least video data. The system comprises a clip configuration subsystem configured to arrange a personalized clip based on pre-configured clip building blocks. Further, the system comprises a service provision subsystem configured to provide a personalized clip telecommunication service by subjecting a respective personalized clip to at least one basic clip utilization service. The basic clip utilization service may be selected from a group comprising a mailbox greeting service for video-enabled terminals, a ring tone service for video-enabled terminals, a ring back tone service for video-enabled terminals, an outbound greeting service for video-enabled terminals, an email service, a download service, a video format conversion service, a common access service, as well as a timer delivery service.

Even though the present invention is described above with reference to the examples according to the accompanying drawings, it is to be understood that the present invention is not restricted thereto. Rather, it is apparent that modifications and variations of the above described elements which come within the customary practice of those skilled in the art shall be included within the scope of the present invention as defined in the appended claims.

The invention claimed is:
1. A system, comprising:
one or more clip configuration servers, including an authorization means, configured to arrange a personalized clip of a second user based on pre-configured clip building blocks by way of one or more user operations, the personalized clip including at least video data, and the user operations including:
adding two or more pre-configured clip building blocks,
amending a pre configured clip building block,
adding individual music to a pre-configured clip building block,
adding one or more pre-configured audio files to a pre-configured clip building block, adding placeholder building blocks,
replacing placeholder building blocks, and
uploading user-edited clips or audio files, or both, for adding the user-edited clips or audio files with a pre-configured clip building block; and
one or more service provision servers configured to provide a personalized clip telecommunication service by subjecting the personalized clip to at least one basic clip utilization service including:
a mailbox greeting service for video-enabled terminals,
a ring tone service for video-enabled terminals,
a ring back tone service for video-enabled terminals,
an outbound greeting service for video-enabled terminals,
an email service,
a download service,
a video format conversion service,
a common access service, and
a timer delivery service,
wherein the authorization means is configured to authorize a first user to configure a first clip, to authorize the second user to create the personalized clip based on the first clip using a first subset of the user operations, and to deny the second user to perform a second subset of the user operations on the first clip, and
wherein the clip configuration server is further configured to store the personalized clip for subsequent utilization by one or more basic clip utilization services provided by the service provision server.

2. The system according to claim 1, wherein the service provision server is further configured to provide the personalized clip telecommunication service by subjecting respective personalized clips to two or more basic clip utilization services selected from said basic clip utilization service group, wherein the pre-configured clip building blocks are re-used for each basic clip utilization service.

3. The system according to claim 1, wherein the download service is configured to use the push short message service according to the wireless application protocol for initiating a download to a mobile terminal.

4. The system according to claim 1, wherein the video format conversion service is configured to convert into the 3GP multimedia container format.

5. A method, comprising:
arranging, using a server based system, a personalized clip of a second user based on pre-configured clip building blocks by way of one or more user operations, the personalized clip including at least video data, and the user operations including:
adding two or more pre-configured clip building blocks,
amending a pre-configured clip building block,
adding individual music to pre-configured clip building block,
adding one or more pre-configured audio files to a pre-configured clip building block,
adding placeholder building blocks,
replacing placeholder building blocks, and
uploading user-edited clips or audio files, or both, for adding the user-edited clips or audio files with a pre-configured clip building block;
providing, using a server based system, a personalized clip telecommunication service by subjecting the personalized clip to at least one basic clip utilization service including:
a mailbox greeting service for video-enabled terminals,
a ring tone service for video-enabled terminals,
a ring back tone service for video-enabled terminals,
an outbound greeting service for video-enabled terminals,
an email service,
a download service,
a video format conversion service,
a common access service, and
a timer delivery service;
authorizing a first user to configure a first clip;
authorizing the second user to create the personalized clip based on the first clip using a first subset of the user operations;
denying the second user to perform a second subset of the user operations on the first clip; and
storing the personalized clip for subsequent utilization by one or more basic clip utilization services.

6. The method according to claim 3, wherein providing a personalized clip telecommunication service comprises subjecting respective personalized clips to two or more basic clip utilization services selected from said basic clip utilization service group, wherein the pre-configured clip building blocks are re-used for each basic clip utilization service.

7. The method according to claim 3, further comprising using the push short message service according to the wireless application protocol by the download service for initiating a download to a mobile terminal.

8. The method according to claim 3, further comprising converting into the 3GP multimedia container format by the video format conversion service.

* * * * *